United States Patent [19]

Inubushi et al.

[11] 4,067,557
[45] Jan. 10, 1978

[54] SYSTEM FOR CHANGING OVER OF BLAST FURNACE TOP PRESSURE CONTROL

[75] Inventors: Masanobu Inubushi; Hajime Yamamoto; Toshiharu Ozaki, all of Kobe, Japan

[73] Assignee: Kawasaki Jukogyo Kabushiki Kaisha, Kobe, Japan

[21] Appl. No.: 702,128

[22] Filed: July 2, 1976

[51] Int. Cl.$^2$ .............................................. C21B 7/00
[52] U.S. Cl. .................................. 266/89; 60/39.2; 60/39.02; 60/39.03; 266/197
[58] Field of Search ................... 60/39.2, 39.24, 39.25, 60/39.02, 39.03, 39.12, 39.46 R; 266/80, 81, 87, 89, 144, 155, 197

[56] References Cited
FOREIGN PATENT DOCUMENTS

| 47-14192 | 1972 | Japan ..................................... 266/155 |
| 391,180 | 12/1973 | U.S.S.R. ................................. 266/89 |

Primary Examiner—Roy Lake
Assistant Examiner—Paul A. Bell
Attorney, Agent, or Firm—Haseltine, Lake & Waters

[57] ABSTRACT

A control changeover system in a blast furnace system including a septum valve having a capability of controlling the furnace top pressure in the blast furnace system and a blast furnace gas energy recovery turbine also having a capability of controlling the top pressure by front pressure control is operated with a slight difference between preset values of the top pressure set by a top pressure setter respectively for control by the septum valve and control by the turbine, whereby the predominance in controlling the top pressure between the two control capabilities is automatically changed over from one capability to the other in accordance with an operation of varying the turbine load by means of a load setter provided for the turbine while the two control capabilities are maintained in operative state.

6 Claims, 1 Drawing Figure

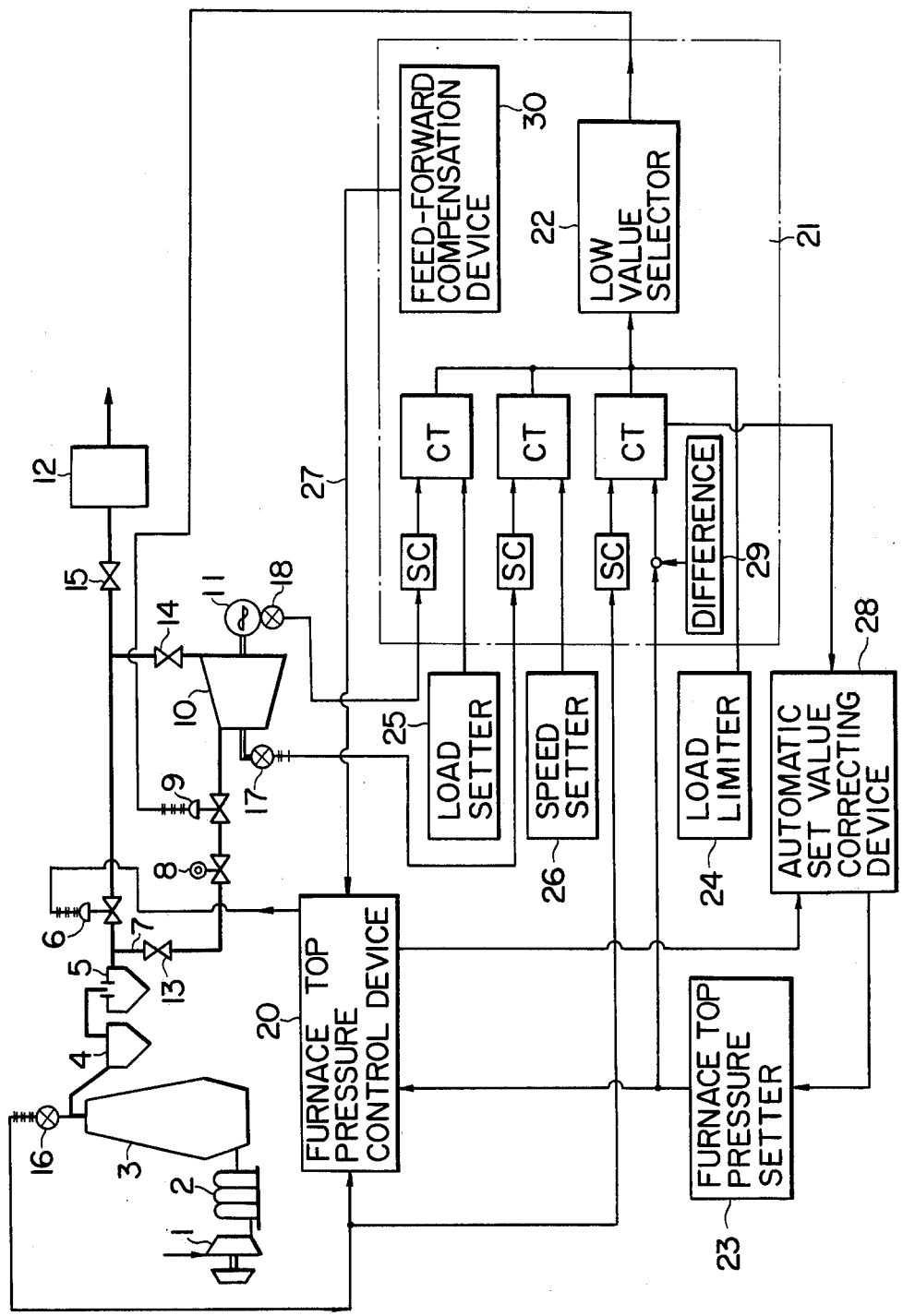

SYSTEM FOR CHANGING OVER OF BLAST FURNACE TOP PRESSURE CONTROL

BACKGROUND OF THE INVENTION

This invention relates generally to blast furnaces and to the control of the furnace top pressure thereof. More particularly, the invention relates to a system for changing over the control of the furnace top pressure in a blast furnace system including a septum valve capable of controlling the top pressure and a blast furnace gas energy recovery turbine installed in a manner to bypass the septum valve and being capable also of controlling the top pressure, that is, a blast furnace gas energy recovery turbine having a so-called front pressure control capability. Elsewhere throughout the present specification, a blast furnace gas energy recovery turbine as mentioned above is referred to simply as a "gas turbine."

In general, the exhaust gas generated in a blast furnace for iron making is passed through a septum valve and supplied to equipment such as a boiler, and recovery of energy retained by the exhaust gas is carried out. The ordinary practice in this case in adjusting the furnace top pressure is to hold it at a preset pressure value by automatically regulating the degree of opening of the above mentioned septum valve.

Alternatively, as a means for minimizing the throttling loss of the exhaust gas energy due to the septum valve, there is employed a system wherein a pipe line bypassing the septum valve is provided, and a gas turbine is installed in this pipe line to receive the total gas quantity, exclusive of leakage gas, at the time of full closure of the spectrum valve. The gas turbine thereby causes this quantity of the gas to expand and release its retained energy to drive a generator coupled to the gas turbine. At the same time, by suitably adjusting a speed regulating valve installed as an accessory of the gas turbine, the furnace top pressure is automatically controlled to a preset pressure.

However, the above described various means of the known systems are respectively practicable as independent control means, but when at attempt is made to use them in combination, it is found that there is no interrelationship therebetween. On the one hand, in the practical operation of the blast furnace system, there are cases where the gas turbine drive is necessary and cases where it is not, because of the fluctuations of the generated exhaust gas quantity and other reasons. Moreover, the variation of this situation is not regularly periodical but, rather, is irregular, occurring suddenly at times.

In order to cope with this fluctuation and thereby to utilize the generated gas energy in an effective and practical manner, a changeover operation for changing over the motive power source for furnace top pressure control each time from the septum valve to the gas turbine and, conversely, from the gas turbine to the septum valve becomes necessary. This operation, however, is extremely complicated, and its reduction to practice is very difficult. Accordingly, it has heretofore been almost impossible to expect smooth changeover of top pressure control in a blast furnace system of the type here being considered.

SUMMARY OF THE INVENTION

It is an object of this invention to provide a changeover system whereby, in a blast furnace system of the above stated type, control by the septum valve and control by the gas turbine can be changed over automatically in a very smooth manner.

According to this invention, there is provided a control changeover system for changing over control between control by a septum valve and control by a blast furnace gas energy recovery turbine in a blast furnace system, each having a capability of controlling the furnace top pressure, the control changeover system being characterized in that, by causing a slight difference to be established between top pressure preset values set by furnace top pressure setter means respectively for control by the septum valve and control by the turbine, the predominance in controlling the top pressure the two control capabilities is automatically changed over from one capability to the other in accordance with an operation of varying the turbine load by means of a load setter provided for the turbine while the two control capabilities are maintained in operative state.

The nature, principles, and utility of the invention will be more clearly apparent from the following detailed description with respect to a preferred embodiment of the invention when read in conjunction with the accompanying drawing.

BRIEF DESCRIPTION OF THE DRAWING

The single FIGURE of the drawing shows a flow chart indicating the essential organization of a blast furnace system in which one example of a system for changeover of blast furnace top pressure control according to this invention is applied.

DETAILED DESCRIPTION OF THE INVENTION

The system for changeover of blast furnace top pressure control according to this invention is suitable for application in a blast furnace system as illustrated. The essential components of this system are a blower 1, a hot stove 2 supplied with air from the blower 1, a blast furnace 3 supplied with hot air from the hot stove 2, a dust catcher 4 and a venturi scrubber 5 for cleaning the top gas discharged from the blast furnace 3, a septum valve 6, a bypass line 7, a main shut-off valve 8 in the line 7, a speed regulating valve 9, a gas turbine 10, a generator 11 coupled directly to the gas turbine 10, and an electrical precipitator 12 through which the exhaust gas is fed to a boiler, these components being connected as shown. Goggle valves 13, 14, and 15 are installed as shown in the pipe lines.

In addition, there are provided a furnace top pressure detector 16 for detecting the top pressure of the blast furnace 3, a rotational speed detector (tachometer) 17 for detecting the rotational speed of the generator 11, and an output detector 18 for detecting the output of the generator 11. These detectors respectively generate detection signals in accordance with their respective detected values and send these signals to the changeover system indicated in the lower half of the figure, which operates in response to these detection signals to carry out appropriate processing and decision operations and then to transmit commands to the aforementioned septum valve 6 and speed regulating valve 9.

The interrelation between the changeover system shown in the lower half of the figure and the blast furnace system illustrated in the upper half thereof will now be described. The principal components of the control mechanism are a furnace top pressure control device 20 for generating commands for the septum valve 6 and a turbine governor 21 installed as an accessory of the gas turbine 10 and generating commands for the speed regulating valve 9. The turbine governor 21 contains components such as signal converters SC, controllers CT, and a low value selector 22. In addition, devices for indicating various preset values for these components, that is, a furnace top pressure setter 23, a turbine load limiter 24, a turbine load setter 25, a rotational speed setter 26, and the like, are provided.

While the furnace top pressure setter 23 is provided for the purpose of imparting the preset value of the top pressure to the furnace top pressure control device 20 and to the turbine governor 21, the preset value imparted to the control device 20 is not the same as that imparted to the turbine governor 21, these values being caused to have a slight different therebetween. This slight difference is given by a difference setter 29. For example, when the preset value imparted to the device 20 is 3 kg./cm$^2$, the preset value imparted to the governor 21 is selected at 2.95 kg./cm$^2$. Furthermore, a feed-forward compensation signal 27 can be transmitted from a feed-forward compensation device 30 in the turbine governor 21 to the top pressure control device 20. This signal 27 is transmitted to cause a command signal to be sent to open the septum valve 6 as an emergency measure, without passing through the normal precess of the low value selection mechanism, to prevent an excessive rise in the furnace top pressure in the case where the gas turbine 10, for some reason, abnormally stops, or its load is cut off, and the main shut-off valve 8 or the speed regulating valve 9 abruptly closes as a consequence.

On the one hand, a pressure signal generated by the furnace top pressure detector 16 is transmitted to the top pressure control device 20 and the turbine governor 21 to be compared in each with the respective preset pressure sent from the furnace top pressure setter 23 and to be processed accordingly. Similarly, a gas turbine rotational speed transmitted from the rotational speed detector 17 to the turbine governor 21 and the generator output transmitted from the output detector 18 are also respectively compared in the turbine governor 21 with respective preset values sent from the rotational speed setter 26 and the load setter 25 and are processed accordingly.

The manner in which the changeover system of the above described organization carries out changeover of control of the furnace top pressure will now be described with respect to specific cases.

A. Changeover of predominance of control of the furnace top pressure from control by the septum valve 6 to that by the speed regulating valve 9.

Initially, control of the top pressure is being carried out automatically by the opening and closing operation of the septum valve 6, and the gas turbine is in its stopped state, the speed regulating valve 9 being fully closed. From this state, the gas turbine 10 is started. For this purpose, the goggle valves 13 and 14 are opened and a signal is transmitted from the load limiter 24 through the low value selector 22 of the turbine governor 21 to the speed regulating valve 9 to open the same to a degree corresponding to a load value set in the load limiter 24. As a result, a portion of the blast furnace exhaust gas passes through the bypass pipe line 7 and flows into the gas turbine 10 to progressively increase the speed thereof, whereby the septum valve 6 tries to close automatically for the purpose of maintaining the furnace top pressure at a constant value based on a preset value.

On the one hand, the turbine governor 21, itself, is supplied with a preset value which is slightly less than the preset top pressure value for the septum valve 6 and has a front pressure control function whereby it tries to cause the speed regulating valve 9 to open for maintaining the furnace top pressure at that preset value. However, since the degree of valve opening of the speed regulating valve 9 is restricted by te load limiter 24, the control of the top pressure at this time is effected only by the septum valve 6. Then, as the rotational speed of the gas turbine 10 increases and reaches the minimum preset value in the rotational speed setter 26, the control regulating to the speed increase of the gas turbine 10 is automatically shifted from the load limiter 24 to the rotational speed setter 26.

With the system in this state, the rotational speed setter 26 is automatically or manually operated to change its preset value to cause the generator 11 to synchronize with an outside electric power system, and the generator 11 is then connected to the outside power system, whereupon the gas turbine 10 thereafter rotates in synchronism with the outside electric power system. Then, as the load of the gas turbine 10 is increased further by using the load setter 25, the septum valve 6 progressively closes in accordance with this load increase until, finally, it reaches the lower limit of its degree of opening, and its function of controlling the top pressure is terminated.

When the gas turbine load is thereafter further increased by using the load setter 25, the top pressure is controlled on the basis of the preset value set in the turbine governor 21, that is, a preset value which is slightly lower than the preset top pressure value for the septum valve 6 in this case, and this state is sustained. More specifically, when the furnace top pressure begins to decrease below the preset value set in the turbine governor 21, the low value selector 22 within the turbine governor 21 operates, whereby a signal requiring a lower degree of valve opening than the signal of the load control, which has been controlling the degree of opening of the speed regulating valve 9 up to this time, is automatically selected, and the gas turbine 10 assumes a state of front pressure control from that of load control. At the same time, the changeover of the control of the furnace top pressure from that by the septum valve 6 to that by the speed regulating valve 9 is completed.

B. Changeover of predominance of control of the furnace top pressure from control by the speed regulating valve 9 to that by the septum valve 6.

It will be assumed that the generator 11 driven by the gas turbine 10 is in a state of parallel operation with an outside power system, and the gas turbine 10, therefore, is rotating in synchronism with the frequency of the outside power system. Furthermore, the furnace top pressure control is being carried out automatically by the operation of the speed regulating valve 9. The furnace top pressure at the present moment is being controlled on the basis of a pressure slightly lower than the preset value of the top pressure for the septum valve 6. For this reason, the septum valve 6 is automatically held at the lower limit of its degree of opening by the furnace top pressure control device 20.

In the case where, with the system in this state, the gas turbine 10 is to be stopped in a normal manner (stopping in a normal state other than emergency [abnormal] stopping) for some reason, the load setter 25 is first manipulated in the direction for reducing the gas turbine load. As a result, the gas turbine load progressively decreases and when it reaches a point where the load control signal becomes smaller in magnitude than the front pressure control signal, the low value selector within the turbine governor 21 operates, and a load control signal is automatically selected in place of the front pressure control signal which has been controlling the degree of opening of the speed regulating value 9 up to this time. Thus, the gas turbine 10 is changed over to load control, and thereafter the speed regulating valve 9 closes in accordance with instruction from the load setter 25.

As the closing action of the speed regulating valve 9 progresses, its degree of opening decreases to an extent wherein it becomes smaller than the lower limit required by the front pressure control. Consequently, the speed regulating valve 9 loses its capability of holding the top pressure at the preset value, and, for this reason, the top pressure begins to rise, exceeding the preset value for the speed regulating valve 9. As a result, when the top pressure reaches the preset value for the septum valve 6, the septum valve 6 begins to open progressively from the lower limit of its degree of opening. Thus the furnace top pressure control is changed over from that by the speed regulating valve 9 to that by the septum valve 6.

C. Emergency stopping or load cut-off of the gas turbine.

In the case where, with the system in the same state as the initial state in the above described changeover action (B), emergency stopping or cutting off of the load of the gas turbine 10 occurs for some reason, the main shut-off valve 8 or the speed regulating valve 9 installed on the input side of the gas turbine 10 closes abruptly, and, consequently, the furnace top pressure rises excessively. The top pressure control thereupon changes over automatically from the speed regulating valve 9 to the septum valve 6. At this time, an excessively great rise in the top pressure will occur unless a preventive measure is taken.

Accordingly, in order to prevent this excessively great pressure rise, a feed-forward compensation device 30 for operating instantaneously upon receiving a signal indicative of an emergency stopping or a signal indicative of a load cut-off of the gas turbine is provided in the turbine governor 21, and a path is provided for transmitting from the turbine governor 21 a feed-forward compensation signal 27 directly with respect to the signal transmission system within the top pressure control device 20 for the septum valve 6. In such a manner, the above mentioned abnormal pressure rise can be prevented.

As described hereinbefore, the operation of changing over the control of the furnace top pressure is accomplished on the basis of a slight difference between preset values of the top pressure which are imparted to the septum valve and the gas turbine. As a consequence, a pressure discrepancy corresponding to the above mentioned slight difference exists between the top pressure at the time when control is being carried out by the septum valve and the top pressure at the time when control is being carried out by the gas turbine. This pressure discrepancy or difference is ordinarily extremely small, but it can be eliminated, and the two pressures made to coincide exactly with each other by providing an automatic set value correcting device 28 to receive signals from the top pressure control device 20 and the turbine governor 21 and transmit a corrected preset value to the top pressure setter 23.

That is, when the changeover of top pressure control is completed in each of the cases (A), (B), and (C) in the aforedescribed operations, the automatic set value correcting device 28 detects this completion of changeover and simultaneously operates automatically to correct the top pressure preset value with respect to the changed over control function to the top pressure preset value immediately prior to the changeover with respect to the control function by which the top pressure control has been carried out up to the time immediately prior to the changeover. By this correction, the regular difference in the top pressure before and after the changeover of the top pressure control is eliminated. In this case, the extremely small difference between the top pressure preset values imparted in the above mentioned control functions is sustained as it is.

By using a changeover system for furnace top pressure control according to this invention as described above, changing over control of the top pressure between that by the septum valve and that by the gas turbine can be accomplished smoothly, positively, and automatically in a simple manner. Moreover, the control after this changeover is continued in a stable manner.

Furthermore, by additionally installing an automatic set value correcting device in accordance with necessity, it is possible to eliminate completely the slight difference in top pressure which is produced by control changeover thereby to operate the blast furnace with constant top pressure before, during, and after the control changeover procedure. Still another feature of the invention is that, by installing means such as the feed-forward compensation device, it is possible to prevent excessive rise in the top pressure, even in the event of abnormal stopping of the gas turbine or cutting off of its load, thereby to continue the furnace operation in a stable manner.

We claim:

1. In a system for changing over control of the furnace top pressure in a blast furnace system, including a septum valve installed in a flowpath of exhaust gas from the furnace top and having a capability of controlling said top pressure, and a blast furnace gas energy recovery turbine installed in a flowpath bypassing the septum valve with a speed regulating valve installed therein upstream of said turbine, said turbine having a capability of controlling said top pressure by front pressure control, the improvement comprising furnace top pressure setter means which sets higher and lower top pressure preset values having a slight difference therebetween and wherein the higher preset value serves for control by the septum valve and the lower preset pressure valve serves for control by the turbine, and load setter means for varying the load on the turbine, whereby the predominance in controlling the furnace top pressure between said two control capabilities is automatically changed over from one capability to the other in accordance with the operation of varying the turbine load by the load setter means while the two control capabilities are maintained in operative state.

2. A system for changing over control of furnace top pressure as claimed in claim 1, further including a load limiter operably coupled to the speed regulating valve to restrict the degree of opening of said valve during the starting up of the turbine.

3. A system for changing over control of furnace top pressure as claimed in claim 1, further including a low value selector means for selecting the lower one of control signals for the top presure control by the turbine and the turbine load control, during the variation of the turbine load, to cause the turbine to be controlled on the basis of the selected value.

4. A system for changing over control of furnace top pressure as claimed in claim 1, further including an automatic set value correcting means for detecting accomplishment of said control changeover, and for automatically revising the top pressure set value in the predominant control capability after changing over the top pressure set value in the predominant control capability prior to changeover with said slight difference in sustained state.

5. A system for changing over control of the furnace top pressure as claimed in claim 1, further including: a furnace top pressure control device for said septum valve; a turbine governor; a furnace top pressure detector for detecting the furnace top pressure and transmitting accordingly a detection signal to the furnace top pressure control device and to the turbine governor; a speed detector for detecting the rotational speed of the turbine and transmitting accordingly a detection signal to the turbine governor; an output detector for detecting the power output of the turbine and transmitting accordingly a detection signal to the turbine governor; said top pressure setter means being operable to establish preset values of furnace top pressure respectively in the furnace top pressure control device in the turbine governor; and said load setter means being operable to establish preset values of turbine load in the turbine governor, the furnace top pressure control device operating in accordance with said signal thus transmitted thereto and with the preset furnace top pressure to transmit a command signal to the septum valve thereby to control the same, the turbine governor operating in accordance with said signals thus transmitted thereto, with the preset furnace top pressure, and with the preset value of the turbine load to transmit a command signal to said speed regulating valve thereby to control the same.

6. A system for changing over control of furnace top pressure as claimed in claim 1, further including a feedforward compensation device provided in the turbine governor and operating instantaneously upon receiving a signal indicative of an emergency or abnormal stopping or a load cut-off of the turbine to transmit a feedforward compensation signal directly to the furnace top pressure control device thereby to prevent abnormal rise in the furnace top pressure.

* * * * *